United States Patent [19]

Bedrosian et al.

[11] Patent Number: 5,602,937
[45] Date of Patent: Feb. 11, 1997

[54] METHODS AND APPARATUS FOR MACHINE VISION HIGH ACCURACY SEARCHING

[75] Inventors: David P. Bedrosian, Franklin; William M. Silver, Medfield, both of Mass.

[73] Assignee: Cognex Corporation, Natick, Mass.

[21] Appl. No.: 252,845

[22] Filed: Jun. 1, 1994

[51] Int. Cl.$^6$ ........................................... G06K 9/00
[52] U.S. Cl. .................................. 382/151; 382/218
[58] Field of Search ..................... 382/151, 144–148, 382/209

[56] References Cited

U.S. PATENT DOCUMENTS

| | | | |
|---|---|---|---|
| 3,936,800 | 2/1976 | Ejiri et al. | 340/146.3 |
| 3,968,475 | 7/1978 | McMahon | 340/146.3 |
| 4,115,702 | 9/1978 | Nopper | 250/560 |
| 4,200,861 | 4/1980 | Hubach et al. | 340/146.3 |
| 4,254,400 | 3/1981 | Yoda et al. | 340/146.3 |
| 4,441,206 | 4/1984 | Kuniyoshi et al. | 382/8 |
| 4,630,306 | 12/1986 | West et al. | 382/21 |
| 4,688,088 | 8/1987 | Hamazaki et al. | 382/151 |
| 4,736,437 | 4/1988 | Sacks et al. | 382/34 |
| 4,783,826 | 11/1988 | Koso | 382/151 |
| 4,783,828 | 11/1988 | Sadjadi | 382/21 |
| 4,860,374 | 8/1989 | Murakami et al. | 382/151 |
| 4,876,728 | 10/1989 | Roth | 382/21 |
| 4,907,169 | 3/1990 | Lovoi | 364/513 |
| 4,922,543 | 5/1990 | Ahlbom et al. | 382/48 |
| 4,926,492 | 5/1990 | Tanaka et al. | 382/18 |
| 4,955,082 | 9/1990 | Terui | 382/8 |
| 4,959,898 | 10/1990 | Landman et al. | 29/705 |
| 4,962,423 | 10/1990 | Yamada et al. | 382/148 |
| 4,972,359 | 11/1990 | Silver et al. | 364/728.5 |
| 5,073,958 | 12/1991 | Imme | 382/22 |
| 5,081,656 | 1/1992 | Baker et al. | 378/21 |
| 5,086,478 | 2/1992 | Kelly-Mahaffey et al. | 382/151 |
| 5,091,861 | 2/1992 | Geller et al. | 364/474.34 |
| 5,113,565 | 5/1992 | Cipolla et al. | 29/25.01 |
| 5,133,022 | 7/1992 | Weideman | 382/18 |
| 5,134,575 | 7/1992 | Takagi | 364/552 |
| 5,206,820 | 4/1993 | Ammann et al. | 382/151 |
| 5,371,690 | 12/1994 | Engel et al. | 364/570 |

*Primary Examiner*—Joseph Mancoso
*Assistant Examiner*—Gerard Del Rosso
*Attorney, Agent, or Firm*—David Powsner; Russ Weinzimmer

[57] ABSTRACT

An improved machine vision apparatus, of the type having a search element capable of estimating the location of a template image in a candidate image, includes an element that accepts signals representative of the template and of a candidate image. Those signals are applied to the search element to obtain its estimate of location. A correction element responds to the resulting approximation by the location-finder for generating a signal representative of more exacting location based on a known relationship between the location-finder output and more exacting locations of the template in a model of the candidate image.

20 Claims, 3 Drawing Sheets

METHODS AND APPARATUS FOR MACHINE VISION HIGH ACCURACY SEARCHING

REFERENCE TO APPENDICES

The disclosure of this patent document contains material which is subject to copyright and/or mask work protection. The owner thereof has no objection to facsimile reproduction by anyone of the patent document or the patent disclosure, as it appears in the U.S. Patent and Trademark Office patent file or records, but otherwise reserves all copyright and/or mask work rights whatsoever.

BACKGROUND OF THE INVENTION

This invention relates to machine vision and, more particularly, to methods and apparatus for high accuracy machine vision searching Searching is a fundamental operation in machine vision. It is used to determine the location of a mark, object or other "template" in an image. For example, in an industrial assembly operation, machine vision may be employed to determine the position of a part base on the position of an imprinted logo. To this end, an image of the part (i.e., the candidate image) is analyzed to find an image of the mark (i.e., the template image). Once identified, that location is passed to the assembly equipment for placement of the part.

The art suggest many searching schemes. Typically, these apply a correlation, or other matching, function to the template and portions of the candidate images, thereby, determining the location at which the candidate is most similar to the template. In some schemes, this function is applied at all locations in the candidate image. In others, it is applied at fewer, selected locations to reduce runtime processing. In either case, a final estimate of location can be made by interpolating between locations at which their is the greatest degree of similarity.

Such prior art schemes typically provide a resolution of ±0.1 pixels to ±0.5 pixels and, on average, of ±0.25 pixels. While this has traditionally proven quite acceptable, there is an increasing need for high accuracy searching.

An object of this invention, therefore, is to provide improved methods and apparatus for machine vision and, particularly, for high accuracy machine vision searching. A further object is to provide such methods and apparatus which can be readily adapted for use in a range of environments, which run rapidly with little runtime processing overhead.

SUMMARY OF THE INVENTION

The foregoing and other objects are attained by the invention, which provides in one aspect, an improvement on a machine vision apparatus of the type having a search element—or more generally, a location-finding element—capable of estimating the location of a (i.e., the coordinates object in a candidate image, where the object is itself shown in a template image.

The improvement serves to determine a more exact location (i.e. more exact coordinates) of a the object in the candidate image based on an empirical relationship between estimates made by the location-finder and locations (i.e., known coordinates) of the object in a model of the candidate image. The improvement is characterized by an element that accepts signals representative of the template image and of the candidate image, and that applies those signals to the location-finder to obtain its estimate of location (i.e., its estimate of the coordinates of the object in the candidate image). A correction element responds to the resulting approximation by the location-finder for generating a signal representative of a more exact location (i.e., more exact coordinates) based on a known, or empirical relationship between the location-finder output and known locations (i.e., known coordinates) of the object.

The correction element can include a table that stores values representing this empirical relationship between location-finder estimates and know location values (i.e., known coordinate values). A look-up element responds to particular values output by the location-finder for looking-up and generating a signal representative of the more exact estimate.

In a related aspect of the invention, the table is provided in two parts, one for the x-axis component of the more exact estimate, and one for the y-axis estimate. These tables are preferably indexed by the values of the corresponding location-finder estimate.

Another aspect of the invention provides a machine vision apparatus as described above further including a training element for determining the empirical relationship between location-finder output and know locations (i.e., known coordinates) of the object in a model of the candidate image, i.e., the model image. For this purpose, the trainer invokes the location-finder with successive views of the model candidate image (along with the template image), each representing a fractionally shifted image of the model candidate. Thus, for example, the location-finder can be invoked with the original model candidate image signal, as well images that have been shifted ¼ pixel, or more (or less), in all directions.

Although the trainer can store the resulting location estimates (i.e., coordinate estimates) of the location-finder as a function of pixel locations associated with original and shifted images, an inversion element can reverse that relationship. That is, it can cause the trainer to store locations of shifted images—i.e., more exact estimates of location (i.e., more exact coordinate estimates)—as a function of corresponding This facilitates later look-up of a more exact location (i.e., more exact coordinates) signal based on a location-finder location (i.e., coordinates) estimate.

These and other aspects of the invention are evident in the drawings and in the text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
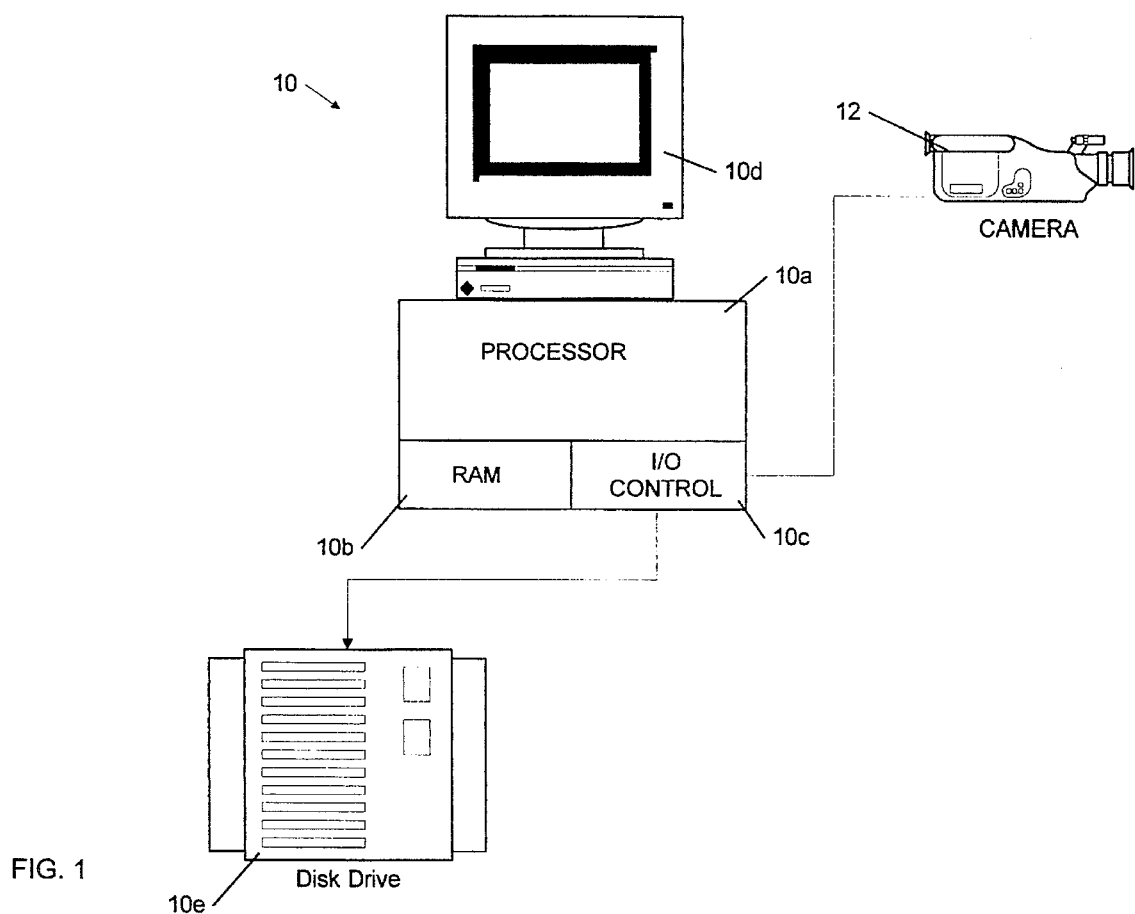
FIG. 1 depicts a preferred environment in which machine vision methods and apparatus according to the invention are implemented.

FIG. 1 depicts a preferred hardware environment in which preferred machine vision methods and apparatus according to the invention are implemented. The environment includes digital data processor 10, having processor 10a, random access memory 10b, input/output controller 10c, monitor 10d and secondary storage device (e.g., disk drive) 10e. Digital data processor 10, including components 10a–10e, preferably comprise a conventional workstation or personal computer of the type known in the art, as configured (e.g., via programming or special purpose hardware) for operation in accord with the teachings hereof. The illustrated environment further includes camera 12 for generating digital images representing an image in its field of view. The camera 12 is of conventional construction and operation known in the art.

Figure 2:
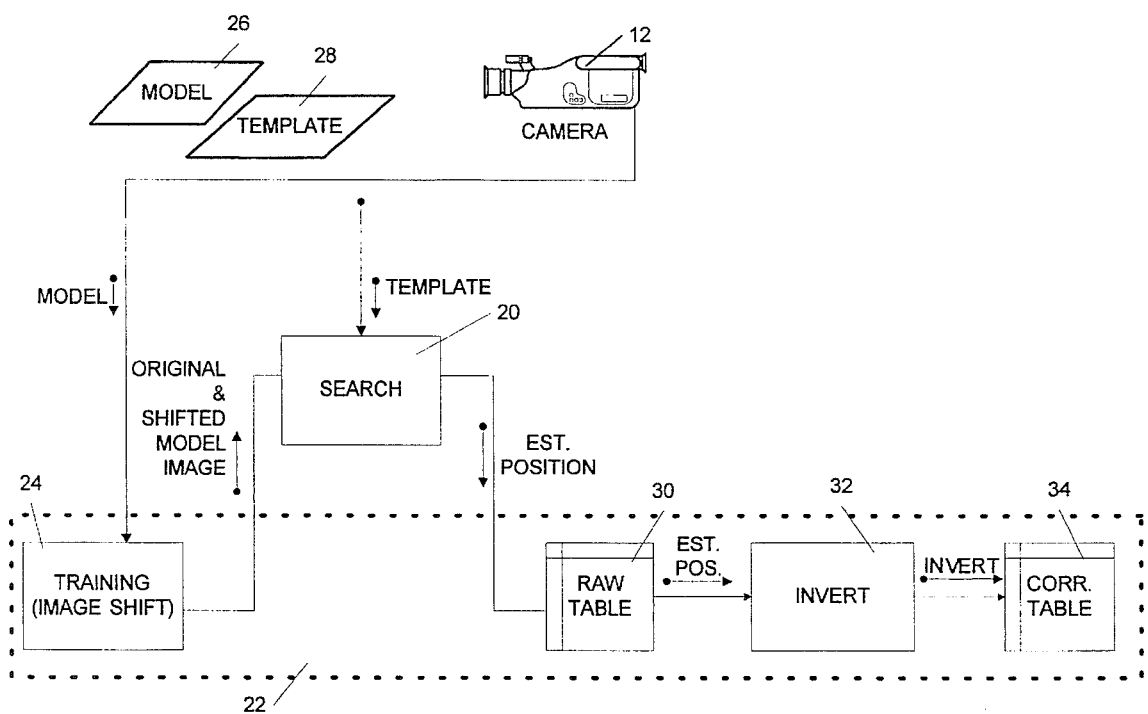
FIG. 2 depicts preferred training-phase functionality for determining an empirical relationship between location-finder estimates and more exact locations of that object in a model of the candidate image.

FIG. 2 depicts a preferred functionality 22 for determining an empirical relationship between object locations estimated by a location-finding element 20 and more exact locations of that object in a candidate image. The functionality 22 includes training element 24, coupled to camera 12 to receive signals representative of a model 26 of the candidate image, i.e., the model image. Those skilled in the an will appreciate that these signals need not be generated by camera 12. Rather, they can be retrieved from a data store (e.g., based on a previously generated camera image) or they can be generated "artificially" by processor 10a.

Training element 24 generates one or more image signals by shifting the original model image signal received from camera 12. Each shifted image simulates a corresponding image as would be generated by camera 12 if its alignment were respectively shifted with respect to model 26. The amount of such shifting is preferably a fraction of the resolution of camera 12. i.e., a fraction of a pixel. In one preferred embodiment, that amount is one-quarter pixel, with functionality 24 generating signals representing shifts of –½ pixel, –¼ pixel, and +¼ pixel in the x-axis and y-axis directions. Those skilled in the art will, of course appreciate that shifts other than one-quarter pixel may be used in accord with the desired degree of accuracy of the final location estimate correction.

Element 20, labeled "SEARCH," represents conventional functionality for estimating the location of a template image in a model or candidate image. A preferred such location-finding element 20 is a conventional "search" vision tool. Such search tools are described in the literature and are commercially available. e.g., by Itran, Applied Intelligent Systems, Inc., ("AISI") and/or Imaging Technology, Inc. ("ITI"). A preferred such search routine is sold by the assignee hereof. Cognex Corporation, under the trade name "Search." In addition to so-called search tools, other vision tools may also be used for element 20. These include general Hough transform.

According to one embodiment of the invention, the image-shift functionality of training element 24 is excluded in favor of generation of actual shifted images, e.g., by shifting alignment of camera 12 and model 26 with stepping motors. In a preferred embodiment. however, shifted images are generated by processor 10a based using conventional digital image shift techniques and. preferably, a cubic convolution technique and, still more preferably, that taught Keys in "Cubic Convolution Interpolation for Digital Image Process." IEEE Trans. Accous. Speech and Signal Processing, Vol. ASSP-29, No. 6, Dec 1981.

In accord with the teachings of the above-cited Keys article, a copy of which is filed herewith, training element 24 expands the model image by a factor of four in each dimension. The expanded image is then sampled down to the size of the original image at each possible subpixel phase (e.g., at axes shifted by –½ pixel, –¼ pixel, and +¼ pixel from that of the original model image). Training element 24 applies the original and shifted images to location-finding element 20 Also applied to that element by camera 12, or other graphics image source, is a signal representative of the template.

Under control of training element 24, element 20 generates a location (i.e., coordinate) estimate of the-position of the object in each of the original and image-shifted model signals. Those location (i.e., coordinate) estimates are stored in raw table 30, constituting a portion of random access memory 10b or disk drive 10e. In one preferred embodiment, the location (i.e., coordinate) estimates are stored in two matrices: one containing the x-axis coordinate of each estimate, the other containing the y-axis coordinate. Along with the estimates, the matrices store the pixel location of the corresponding shifted (or unshifted) model image from which the location (i.e., coordinate) estimate was generated.

Exemplary. such matrices, entitled "Raw X" and "Raw Y," are shown below, with the coordinates of the corresponding shifted and unshifted model in the margins. It will be appreciated that the coordinates in the table—i.e., those in the margins as well as those in the body—are relative to the integer portion of the location of the original model image.

| Raw X | | | | | |
|---|---|---|---|---|---|
| | | | [x-coord] | | |
| | x-coord<br>y-coord | –0.50 | –0.25 | 0.00 | 0.25 |
| [y-coord] | –0.50 | –.703 | –.066 | .154 | .050 |
| | –0.25 | –.602 | –.313 | –.082 | .125 |
| | 0.00 | –.510 | –.217 | –.005 | .203 |
| | 0.25 | –.418 | –.139 | .062 | .297 |

| Raw Y | | | | | |
|---|---|---|---|---|---|
| | | | [x-coord] | | |
| | x-coord<br>y-coord | –0.50 | –0.25 | 0.00 | 0.25 |
| [y-coord] | –0.50 | –.359 | –.574 | –.506 | –.434 |
| | –0.25 | –.102 | –.268 | –.211 | –.156 |
| | 0.00 | .107 | –.052 | .001 | .056 |
| | 0.25 | .102 | .158 | .203 | .260 |

As evident above, the raw matrices store the location-finder's location (i.e., coordinate) estimates as a function of known locations (i.e., known coordinates) of the location of the object. In a preferred embodiment, those tables are inverted for quicker access at run time. To this end, inversion element 32 converts the Raw X and Raw Y tables to provide the more exacting estimates as a function of the location-finder estimates. These converted tables are stored in store 34, again, consisting a portion of random access memory 10b or disk drive 10e. As above, the converted matrices are preferably stored in two matrices: one containing the x-axis coordinate values, the other containing the y-axis coordinate values.

As so converted, the exemplary raw tables above result in the following corrected matrices:

| Corr. Y | | | | | |
|---|---|---|---|---|---|
| x-coord<br>y-coord | −0.50 | −0.25 | 0.00 | 0.25 | 0.50 |
| [y-coord] −0.50 | −.388 | −.440 | −.495 | −.506 | −.637 |
| −0.25 | −.165 | −.229 | −.283 | −.335 | −.394 |
| 0.00 | .127 | .062 | −.001 | −.066 | −.128 |
| 0.25 | .394 | .336 | .290 | .238 | .170 |
| 0.50 | .639 | .569 | .505 | .446 | .391 |

| Corr. X | | | | | |
|---|---|---|---|---|---|
| x-coord<br>y-coord | −0.50 | −0.25 | [x-coord]<br>0.00 | 0.25 | 0.50 |
| [y-coord] −0.50 | −.327 | −.091 | .190 | .452 | .705 |
| −0.25 | −.412 | −.182 | .099 | .364 | .593 |
| 0.00 | −.491 | −.278 | .006 | .291 | .508 |
| 0.25 | −.573 | −.349 | −.077 | .200 | .428 |
| 0.50 | −.667 | −.427 | −.175 | .101 | .346 |

According to a preferred embodiment of the invention, conversion of the raw tables into the correction tables is accomplished by first generating intermediate tables corresponding to Raw X and Raw Y. The intermediate table for the x-axis, Int X, is formed by determining the difference between actual x-axis positions and estimated x-axis positions (from location-finder 20) at each y-axis position in Raw Y. These differences are interpolated in order to define entries at, e.g., ¼ pixel intervals. Likewise, the intermediate table for the y-axis, Int Y, is formed by interpolating differences between actual y-axis positions and estimated y-axis positions at each x-axis position in Raw X. Interpolation is used to expand these tables by a factor of 2.

In making the final correction tables, x-axis and y-axis values are not independent: Corr. X and Corr. Y correction tables are both dependent on Raw X and Raw Y, as well as the intermediate tables. For example, if the reported value of X is some value at an actual (Xn, Yn), the reported value of X at the actual (Xn, Y(n+1)) is not necessarily the same.

To approximate this, lines in the X intermediate matrix are connected from point to point along the Y axis; and in the Y intermediate matrix, lines are connected along the X axis. The X value of the intersection points of the lines in the X intermediate matrix with the lines in the Y intermediate matrix from the X correction matrix, and the Y values form the Y correction matrix.

CorrX (ReportedX, ReportedY)=InterpolatedActualX
CorrY (ReportedX, ReportedY)=InterpolatedActualY Those skilled in the art will appreciate that, for an uncorrected search, there may be a discontinuity in the subpixel position values returned from searching as the position crosses the half-pixel boundary. This is because different correlation values may be used for the parabolic fit when the position crosses the boundary into the other pixels.

We account for this discontinuity by running the tables from −0.5 to 0.5, instead of from 0 to 1. This allows us to have two different values for the half pixel position. Which one is used depends on which side of the boundary the peak is on.

To implement this, when the raw data is being processed, the elements are tested to see if they belong on the other side of the half-pixel boundary. If an element belongs on the other side of this boundary, it is moved to the other side of the table (tables have an extra element along the relevant axis), and a value is extrapolated to take its place.

Figure 3:
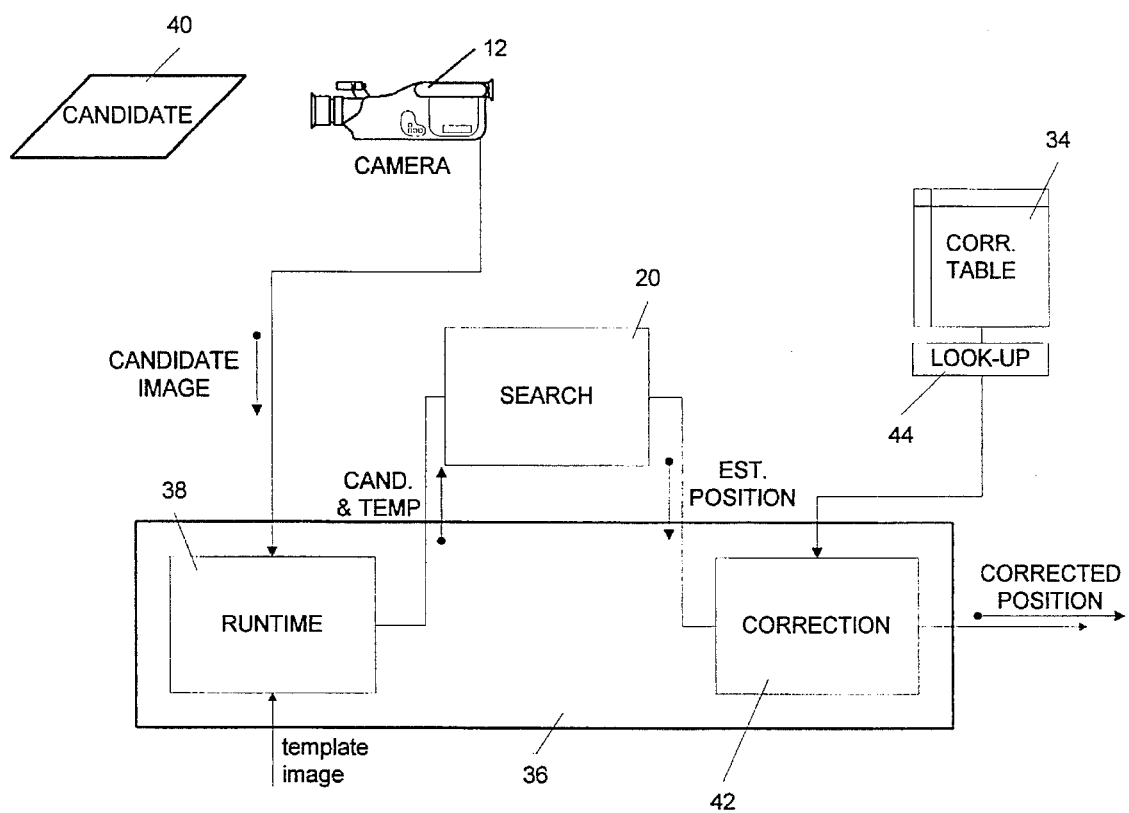
FIG. 3 depicts a preferred runtime functionality for determining a more exact location of an object in a candidate image based on a empirical relationship between location-finder estimates and more exact locations of that object in a candidate image.

FIG. 3 depicts a preferred functionality 36 for determining a more exact location of the object in a candidate image based on an empirical relationship, reflected in correction table 34, between locations estimated by the location-finder and known locations of the object in a model of the candidate image. Functionality 36 includes runtime element 38 coupled to camera 12 to receive signals representative of an image of a candidate 40 in which the object is to be found.

Runtime element 38 invokes location-finding element 20 with the candidate image signal, as well as with a template signal that is, preferably, identical or similar to that used by functionality 22 during the training phase of operation.

Correction element 42 corrects the location (i.e., coordinate) estimate generated by the location-finder 20 based on values in the correction table 34. In this regard, the correction element 42 relies on look-up functionality 44 for identifying the closest entries in the correction matrices. The correction element 42 then, preferably, interpolates between the values of those entries using linear interpolation and, more preferably, by bilinear interpolation.

The corrected value is then output for use in further processing by correspondent vision machine apparatus.

A further understanding of the invention may be attained by reference to the following a software listing of a preferred embodiment of the invention.

Described above are improved methods and apparatus for high accuracy machine vision searching meeting the objects set forth above. Those skilled in the art will appreciate that the embodiments described herein are exemplary and that further methods and apparatus incorporating modification thereto may fall within the scope of the invention, of which we claim:

1. In a machine vision apparatus of the type having
    location finding means, responsive to an applied template image-representative signal and an applied candidate image-representative signal, for determining an approximate location, in the candidate image, of an object shown in the template image, and for generating an approximation signal representative of such location, the improvement for determining a more exact location in the candidate image of the object shown in the template image, comprising
    A. means for inputting a signal representative of said template image and a signal representative of said candidate image,
    B. runtime means for invoking said location finding means with said template image-representative signal and said candidate image-representative signal,
    C. correction means, coupled to said location finding means, for generating a signal representative of a more exact location of said object in said candidate image as a function of an empirically-based relationship between an approximate location determined by said location finding means and a known location of said object, the empirically-based relationship determined from prior invocation of the location finding means with the template image-representative signal and one or more signals representative of a model candidate image at known locations.

2. In a machine vision apparatus according to claim 1, the further improvement wherein said correction means comprises
    A. table means for storing values representative of an empirically-based relationship between approximation signals generated by said location finding means and corresponding more exact locations of said template, and B. look-up means, coupled with said table means, for responding to a signal representative of a value represented by an approximation signal for generating a signal representative of a corresponding more exact value of said location.

3. In a machine vision apparatus according to claim 2, the further improvement wherein said table means includes means for storing values representative of more exact values of said location as indexed by values of approximation signals generated by said location finding means.

4. In a machine vision apparatus according to claim 3, the further improvement wherein said table means includes a first and second tables for storing, respectively, values representative of first and second coordinates of said more exact locations as indexed by values of approximation signals generated by said location finding means.

5. In a machine vision apparatus according to claim 1, the further improvement comprising training means, responsive to a signal representative of an object shown in said template image and a signal representative of a model candidate image, for generating signals representative of an empirically-based relationship between approximation signals generated by said location finding means and corresponding known locations of said template.

6. In a machine apparatus according to claim 5, the further improvement wherein said training means comprises means for invoking said location finding means with said template image-representative signal and with signals representative of successive model candidate image-representative signals for determining said empirically-based relationship.

7. In a machine apparatus according to claim 6, the further improvement wherein said training means comprises inversion means for responding to approximation signals generated by said location finding means to index values representative of locations corresponding to model candidate images by the values of approximation signals generated by said location finding means.

8. In a machine vision apparatus according to claim 6, the further improvement wherein said training means comprises image shifting means for shifting a signal representative of said model candidate image one or more times to generate respective ones of said successive model candidate image-representative signals.

9. In a machine vision apparatus according to claim 8, the further improvement wherein said image shifting means comprises means for shifting a signal representative of said model candidate image in increments corresponding to one or more fractions of a pixel to generate respective ones of said successive model candidate image-representative signals.

10. In a machine vision apparatus according to claim 6, the further improvement wherein said image shifting means comprises means for shifting by cubic convolution interpolation a signal representative of said model candidate image.

11. In a method for operating a machine vision apparatus of the type having location finding means, responsive to an applied template image-representative signal and an applied candidate image-representative signal, for determining an approximate location of an object shown in said template image in said candidate image and for generating an approximation signal representative of such location, the improvement for determining a more exact location, in the candidate image of an object shown in the template image, comprising A. an inputting step for inputting a signal representative of said template image and a signal representative of said candidate image, B. a runtime step for invoking said location finding means with said image-representative signal and said candidate image-representative signal, C. correction step for generating a signal representative of a more exact location of said template image in said candidate image as a function of an empirically-based relationship between an approximate location determined by said location finding means and a known location of said object, the empirically-based relationship determined from prior invocation of the location finding means with the template image-representative signal and one or more signals representative of a model candidate image at known locations.

12. In a method according to claim 11, the further improvement wherein said correction step comprises A. storing, in a table, values representative of an empirically-based relationship between approximation signals generated by said location finding means and corresponding known locations of said template, and B. responding to a signal representative of a value represented by an approximation signal for looking up in said table a signal representative of a corresponding more exact value of said location.

13. In a method according to claim 12, the further improvement wherein said storing step includes the step of storing values representative of more exact locations as indexed by values of approximation signals generated by said location finding means.

14. In a method according to claim 13, the further improvement wherein said storing step comprises the step of storing in first and second tables, respectively, values representative of first and second coordinates of more exact values of said location as indexed by values of approximation signals generated by said location finding means.

15. In a method according to claim 11, the further improvement comprising a training step for responding to a signal representative of said template image and a signal representative of a model candidate image by generating signals representative of an empirically-based relationship between approximation signals generated by said location finding means and corresponding known locations of said template.

16. In a method according to claim 15, the further improvement wherein said training step comprises a step for invoking said location finding means with said template image-representative signal and with signals representative of successive model candidate image-representative signals for determining said empirically-based relationship.

17. In a method according to claim 16, the further improvement wherein said training step comprises an inversion step for responding to approximation signals generated by said location finding means to index values representative of locations corresponding to model candidate images by values of approximation signals generated by said location finding means.

18. In a method according to claim 16, the further improvement wherein said training step comprises an image shifting step for shifting a signal representative of said model candidate image a one or more times to generate respective ones of said successive model candidate image-representative signals.

19. In a method according to claim 18, the further improvement wherein said image shifting step comprises a step for shifting a signal representative of said model candidate image in increments corresponding to one or more fractions of a pixel to generate respective ones of said successive model candidate image-representative signals.

20. In a method according to claim 16, the further improvement wherein said image shifting step comprises a step for shifting by cubic convolution interpolation a signal representative of said model candidate image.

* * * * *